(12) United States Patent
Yocam et al.

(10) Patent No.: US 11,418,949 B2
(45) Date of Patent: Aug. 16, 2022

(54) BEHAVIORAL BIOMETRIC PROTECTION FOR WIRELESS CARRIER SUBSCRIBERS

(71) Applicant: T-Mobile USA, Inc., Bellevue, WA (US)

(72) Inventors: Eric Yocam, Sammamish, WA (US); Ahmad Arash Obaidi, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 303 days.

(21) Appl. No.: 15/931,488

(22) Filed: May 13, 2020

(65) Prior Publication Data

US 2021/0360394 A1 Nov. 18, 2021

(51) Int. Cl.
| | |
|---|---|
| *H04W 12/02* | (2009.01) |
| *G06N 5/02* | (2006.01) |
| *H04N 7/167* | (2011.01) |
| *H04L 9/40* | (2022.01) |
| *H04L 12/28* | (2006.01) |

(52) U.S. Cl.
CPC .............. *H04W 12/02* (2013.01); *G06N 5/02* (2013.01); *H04L 12/2876* (2013.01); *H04L 63/107* (2013.01); *H04L 63/20* (2013.01); *H04N 7/167* (2013.01)

(58) Field of Classification Search
CPC ...... H04W 12/02; H04L 63/04; H04L 63/107; H04L 12/2876; H04L 63/20
See application file for complete search history.

(56) References Cited

U.S. PATENT DOCUMENTS

| | | | |
|---|---|---|---|
| 7,911,509 B2 | 3/2011 | Jendbro | |
| 8,254,412 B2 | 8/2012 | Faucheur et al. | |
| 9,519,762 B2 | 12/2016 | Williams et al. | |
| 9,779,423 B2 | 10/2017 | Turgeman | |
| 2006/0195328 A1 | 8/2006 | Abraham et al. | |
| 2016/0248809 A1* | 8/2016 | Smith | H04L 63/20 |
| 2017/0289144 A1* | 10/2017 | Ionita | G06F 21/32 |

OTHER PUBLICATIONS

Abdulaziz Alzubaidi and Jugal Kalita. Authentication of Smartphone Users Using Behavioral Biometrics. arXiv, Cornell University. Nov. 11, 2019, pp. 1-32 [online], [retrieved Apr. 1, 2020], Retrieved from the Internet URL: https://arxiv.org/abs/1911.04104.

* cited by examiner

*Primary Examiner* — Ellen Tran
(74) *Attorney, Agent, or Firm* — Han Santos, PLLC

(57) ABSTRACT

A video stream from a user device that is destined for a recipient device is received at a core network of a wireless carrier network. The video stream has a video quality that at least meets a quality threshold for behavioral biometric analysis. A determination of whether a video privacy policy for the user device permits transmission of the video stream of the video quality to the recipient device is made. In response to the video privacy policy not permitting the transmission of the video stream of the video quality, the video quality of the video stream is downgraded to generate a downgraded video stream that prevents behavioral biometric analysis for transmission to the recipient device. However, in response to the video privacy policy permitting the transmission of the video stream of the video quality, the video stream of the video quality is transmitted to the recipient device.

20 Claims, 6 Drawing Sheets

BEHAVIORAL BIOMETRIC PROTECTION FOR WIRELESS CARRIER SUBSCRIBERS

BACKGROUND

Behavioral biometrics is the field of study related to the measurement of uniquely identifiable patterns in user behavior. For example, such user behavior may include facial expressions, facial movements, speech patterns, body movements, eye movements, and gaze patterns, etc. Behavioral biometrics are inherently different from physiological biometrics, which are biometrics based on the physiological characteristics of persons. For example, physiological characteristics may include fingerprints, facial features, iris patterns, hand geometries, and/or so forth.

As mobile devices and IoT devices are increasingly being equipped with high-resolution cameras and advanced machine-learning capabilities, it becomes easier for various parties (e.g., insurance carriers, advertisers, government agencies, healthcare providers, etc.) to analyze uploaded video footages and video streams for behavioral biometrics that can be used to track behavior characteristics of users and form inferences about the users based on the behavior characteristics. For example, an insurance carrier may identify a user with certain behavioral biometrics as having a high probability of being afflicted with or predisposed to an undiscovered medical condition or illness. In some instances, users may desire to prevent unwanted behavioral biometric analysis as they stream video of themselves online or upload video footage of themselves to online content sharing websites.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
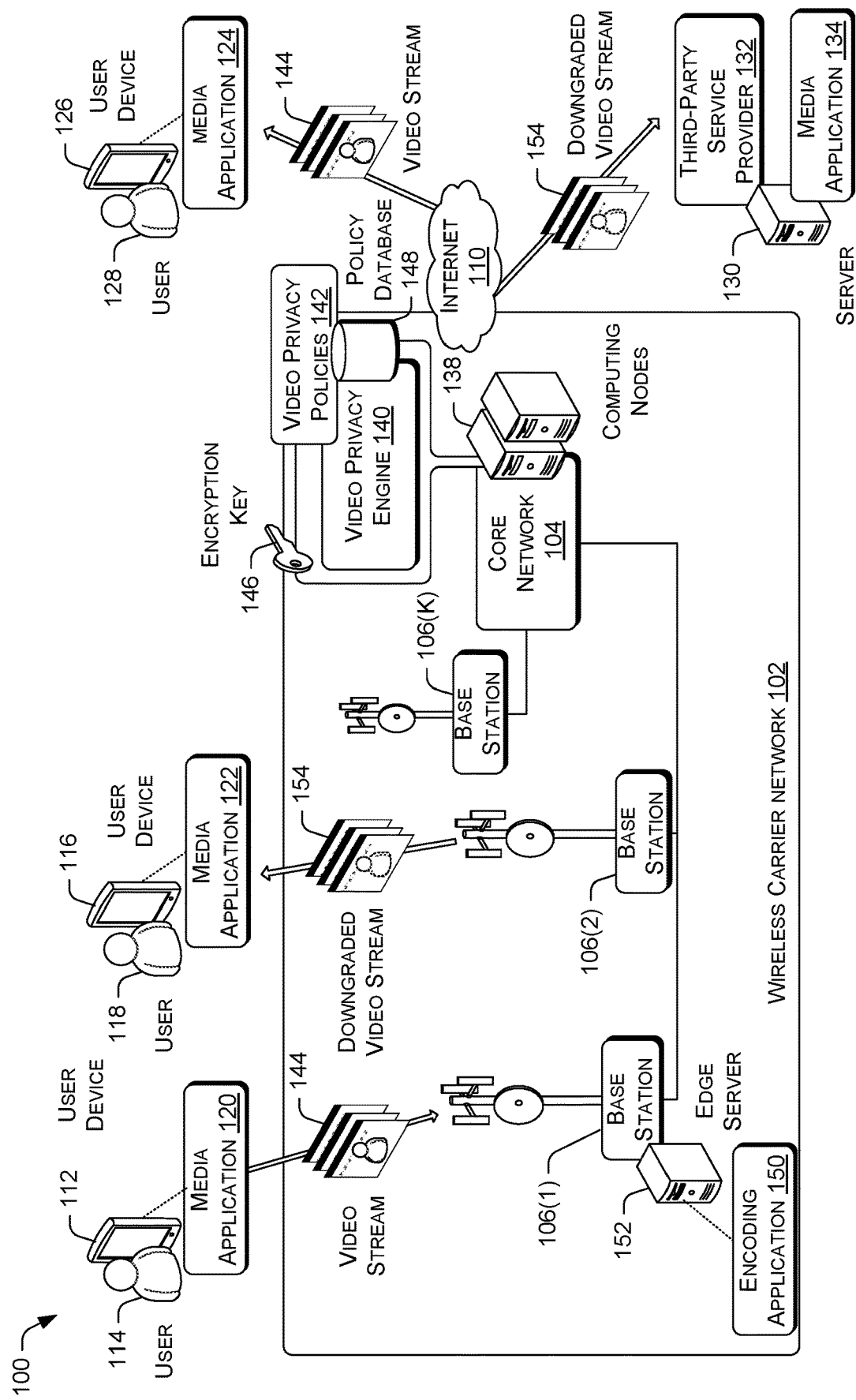
FIG. 1 illustrates an example architecture for a wireless carrier network to implement video privacy policies and services to protect video data of subscribers from unwanted behavioral biometric analysis.

This disclosure is directed to techniques that enable a mobile network operator (MNO) of a wireless carrier network to prevent or minimize unwanted behavioral biometric analysis of its subscribers as they stream videos of themselves online or upload video footage of themselves to online content sharing websites. A subscriber may set up a video privacy policy with the wireless carrier network that indicates which parties are allowed to access video streams from a user device with video qualities that are susceptible to behavioral biometric analysis. Thus, as the wireless carrier network is carrying a video stream from the user device of the subscriber to a recipient device of a recipient, a video privacy engine in the core network of the wireless carrier network may determine that the video quality of the video stream is sufficiently high to be used for behavioral biometric analysis. In such a scenario, the video privacy engine may access the video privacy policy established for the user device to determine whether the recipient device is permitted to receive the susceptible video stream having the video quality. If the recipient device is not permitted to receive the susceptible video stream, the video privacy engine may downgrade the video quality of the video stream before transmitting the video stream to the recipient device. In some embodiments, the downgrade may be accomplished by re-encoding the video stream to a lower video resolution while maintaining the same bitrate, maintaining the same video resolution while downgrading to a lower bitrate, or a combination of a lower video resolution and a lower bitrate. In other embodiments, the downgrade may be accomplished by using a scramble mask to scramble the video stream. In additional embodiments, the downgrade may be accomplished by directing the user device to encode the video stream captured by its camera at a lower resolution and/or bitrate to prevent behavioral biometric analysis. In at least some implementations, the video privacy engine may be configured to direct the user device to warn the subscriber regarding the susceptibility of the video stream to behavioral biometric analysis, in which the video stream is downgraded for transfer to the recipient device only when prompted to do so by the subscriber following the warning.

In other instances, a subscriber may set up a video privacy policy with the wireless carrier network that indicates whether the user device of the subscriber is permitted to capture and store video streams with video qualities that are susceptible to behavioral biometric analysis on the user device. Thus, when the user device is used to capture a new video stream, an application on the user device may analyze the video stream to determine whether it is of sufficiently high video quality to be susceptible to behavioral biometric analysis. Thus, if the video stream is determined to be susceptible to behavioral biometric analysis, the application may request the video privacy engine of the wireless carrier network to access the video privacy policy established for the user device. The video privacy policy is then used by the video privacy engine to determine whether the user device is permitted to capture and store the susceptible video stream on the user device. Thus, when the user device is not permitted to capture and store the susceptible video stream, the video privacy engine may direct the application on the user device to downgrade the video quality of the video stream. In various embodiments, the application may re-encode the susceptible video stream into a downgraded video stream with lower video quality, in which the downgraded video stream is not susceptible to behavioral biometric analysis. The application may further encode any new image signals captured by a camera of the user device for the video stream at the lower video quality. In at least some implementations, the application may be configured to warn the subscriber regarding the susceptibility of the video stream to behavioral biometric analysis, in which the downgraded version of the video stream is captured and stored only when prompted to do so by the subscriber following the warning.

The techniques may enable an MNO to protect the privacy of subscribers as the subscribers capture, upload, or stream video footages through the wireless carrier network of the MNO. In this way, rather than merely acting as a communication conduit for subscriber data, the MNO may play a key role in protecting the privacy of its subscribers. The techniques described herein may be implemented in a number of ways. Example implementations are provided below with reference to the following figures.

Example Architecture

FIG. 1 illustrates an example architecture 100 for a wireless carrier network to implement privacy protection policies and services to protect subscribers from unwanted behavioral biometric analysis. The wireless carrier network 102 may provide a wide range of mobile communication services, as well as ancillary services and features, to subscribers and associated mobile device users. The wireless carrier network 102 may be operated by a mobile network operator (MNO). In various embodiments, the wireless carrier network 102 may provide wireless communication between multiple user devices. Further, the wireless carrier network 102 may also provide communications between the multiple user devices and user devices that are serviced by other telecommunications networks. The telecommunication services provided may include voice communication, multimedia communication, data communication, such as email, messaging, content streaming, content uploading, and/or so forth.

The wireless carrier network 102 may be implemented using multiple interconnected networks. In various embodiments, the wireless carrier network 102 may include multiple Radio Access Networks (RANs). The RANs may be connected to each other via regional ground networks. In turn, the regional ground networks may be connected to a core network 104 by a wide area network (WAN). Each regional portion of the wireless carrier network 102 may include one or more RANs and a regional circuit and/or packet-switched network and associated signaling network facilities. The wireless carrier network 102 may provide telecommunication services in accordance with one or more technical standards, such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), 5th Generation (5G), and/or so forth.

A RAN of the wireless carrier network 102 may include a number of base stations, such as the base stations 106(1)-106(K), also referred to as network cells. In some embodiments, the base stations may be in the form of nodes. Each node may include a base transceiver system (BTS) that communicates via an antenna system over an air-link with one or more user devices that are within range. The BTS may send radio communication signals to user devices and receive radio communication signals from user devices. The RANs may carry the communications of the user devices between the respective base stations and the core network 104. The core network 104 may include components that support 2G and 3G voice communication traffic, as well as 3G, 4G, and 5G data communication traffic. For example, 3G data communication traffic between a user device and the Internet may be routed through a gateway of a 3G Packet Switch (PS) Core. On the other hand, 3G voice communication traffic between the user device and a Public Switched Telephone Network (PSTN) may be routed through a Mobile Switch (MSC) of a 3G Circuit Switch (CS) core. The core network 104 may further include components that support 4G and 5G voice and data communication traffic. Such components may include an Evolved Packet Core (EPC) and an IP Multimedia Subsystem (IMS) core. The IMS core may provide the user devices with data access to external packet data networks, such as the networks of other wireless telecommunication providers, as well as backend servers in the core network 104. The core network 104 may connect to a public packet data communication network, such as the Internet 110, via one or more gateways. Accordingly, data and voice communications via the RANs, the core network, and the Internet 110 may support a variety of telecommunication services through the wireless carrier network 102.

The wireless carrier network 102 may provide telecommunication services to multiple user devices. In some instances, the user devices may include smartphones, tablet computers, embedded computer systems, or any other device that is capable of using the wireless communication services that are provided by the wireless carrier network 102. For example, a user device 112 of a user 114 may be in communication with the base station 106(1). Likewise, a user device 116 of a user 118 may be in communication with the base station 106(2). In one scenario, the user 114 may use a media application 120 on the user device 108 to establish a multimedia call that includes a video stream with a media application 122 on the user device 116. In another scenario, the user 114 may use the media application 120 on the user device 112 to send a video stream to a media application 124 on the user device 126 of the user 128 via the Internet 110. In some instances, the user 128 may be a subscriber of a wireless carrier network that is provided by another MNO. In other instances, the user 128 may be using a web conferencing service to conduct a live video chat with the user 114. In a further scenario, the user 114 may use the media application 120 on the user device 112 to upload a video stream to a server 130 of a third-party service provider 132. For example, the third-party service provider 132 may be a video-sharing website, an online video storage web site, an online video editing website, and/or so forth. Accordingly, the media application 134 on the server 130 may perform various video processing functions, such as storage, editing, compression, streaming, etc.

The wireless carrier network 102 may be equipped with a video privacy engine 136 that resides on one or more computing nodes 138 of the core network 104. In some embodiments, the video privacy engine 140 may distribute encryption keys to computing devices (user devices, servers, etc.) that exchange video streams at least partially via the wireless carrier network 102. For example, the encryption keys may include symmetric encryption key pairs or asymmetric encryption key pairs. Accordingly, a user device may use an encryption key to encrypt a video stream that is transferred at least partially via the wireless carrier network 102 to an additional user device. In turn, the additional user device may use a corresponding encryption key to decrypt the video stream. The video privacy engine 140 may provide such encryption keys following registration of the computing devices with the video privacy engine 140.

For example, the video privacy engine 140 may receive a registration request from a computing device in which the registration request includes a device identifier of the computing device. The registration request may be initiated by a media application on a corresponding computing device, (e.g., the media application 120 on the user device 112, the media application 134 on the server 130, etc.). The computing device may send the registration request to an online portal of the video privacy engine 140. The online portal may be accessed by sending the registration request to a website or an Internet Protocol (IP) address. In some embodiments, the registration request may further include an authorization code that is distributed by the video privacy engine 140. Accordingly, the video privacy engine 140 may use the authorization code to determine that the computing is authorized to register with the video privacy engine 140. The device identifier may be an International Mobile Station Equipment Identity (IMEI), a Mobile Equipment Identifier (MEID), a destination Internet Protocol (IP) address, a media access control (MAC) address, an electronic serial number (ESN), and/or so forth. In some instances, the registration request may include information regarding the computing device. For example, the information may include device model information, device manufacturer information, identification information of the operator, contact information of the operator, billing information of the operator, and/or so forth.

The video privacy engine 140 may receive video privacy policies 142 from the subscribers of the wireless carrier network 102. A subscriber may access an online portal via a website or an IP address to customize a video privacy policy. In various embodiments, a subscriber may navigate to the online portal via a web browser or a client application on a user device. For example, the online portal may present checkboxes, selection menus, and/or other user interface controls for configuring the video privacy policy. In this way, the subscriber may authorize specific recipient devices to receive video streams with sufficiently high video quality that support behavioral biometric analysis, select specific techniques for downgrading the video quality of the video streams, authorize video capture and storage by specific user devices, and/or so forth. The configuration settings with respect to encryption, authorization for sending or receiving high quality video streams, video downgrading techniques, video capture, and video storage in a video privacy policy may be further applied to a specific time period, such as a particular time period in a day, a week, a month, and/or a year. In some instances, a video privacy policy may be configured with an expiration date. Each of the video privacy policies 142 may be a policy that is developed solely by a subscriber or a policy that is jointly developed by the MNO and the subscriber. For example, the MNO may provide a subscriber with a default data protection policy via the online portal for further modification by the subscriber.

In one example operation, the video privacy engine 140 may detect that the media application 120 on the user device 112 is sending a video stream 144 through the core network 104 of the wireless carrier network 102 to a recipient device. In various embodiments, the media application 120 may be a telephony application, a messaging application, a video conferencing application, a video broadcast application, a video upload application, or some type of application that is capable of video streaming. In response, the video privacy engine 140 may determine whether a video quality of the video stream 144 at least meets a video quality threshold for behavioral biometric analysis. In some instances, the video stream 144 may be encrypted by the media application 120 using an encryption key 146 provided by the video privacy engine 140. Consequently, the video privacy engine 140 may decrypt the video stream 144 using a copy or a counterpart key of the encryption key 146 for the purpose of determining the video quality. Thus, assuming the video quality at least meets the video quality threshold, the video privacy engine 140 may retrieve a corresponding video privacy policy from a policy database 148. The video privacy engine 140 may use the video privacy policy to determine whether the recipient device is authorized to receive the video stream of the video quality.

If the recipient device is not authorized, the video privacy engine 140 may downgrade the video quality of the video stream 144 according to a configuration setting in the video privacy policy. In some instances, the downgrading may involve the video privacy engine 140 directing a video encoding application (e.g., a video encoding application 150) in an edge server (e.g., edge server 152) that is implemented at a base station, such as base station 106(1), to re-encode the video stream 144 into a downgraded video stream. The downgraded video stream has a lower video quality than the video stream 144. For example, the lower video quality may be the result of a lower encoding resolution and/or a lower encoding bitrate. The video encoding application may re-code the video stream 144 into the downgraded video stream as the base station 106(1) receives the video stream 144. The downgraded video stream is then sent by the base station 106(1) in place of the video stream 144 to the core network 104. In turn, the downgraded video stream is then transferred by the core network 104 to the recipient device. However, in alternative embodiments, the video encoding application 150 may be implemented as a part of the video privacy engine 140 instead of on an edge server of a base station.

In other instances, the downgrading may involve the video privacy engine 140 using a scramble mask function to scramble the content of the video stream 144. The use of the scramble mask may introduce video artifacts or noise that obscures or blurs some image details in the video stream 144, thereby creating a downgraded video stream. The downgraded video stream is then sent by the core network 104 to the recipient device. In such an example, the edge server 152 may be equipped with the scramble mask function. Accordingly, the video privacy engine 140 may direct the edge server 152 of the base station 106(1) to apply the scramble mask function to the incoming video stream 144 to generate the downgraded video stream. The downgraded video stream is then sent by the base station 106(1) to the core network 104. In still other embodiments, the user device 112 may be equipped with a scramble mask function. Accordingly, the video privacy engine 140 may direct the user device 112 to apply the scramble mask function to the video stream 144 as encoded by a video encoding algorithm of the user device 112, so that a downgraded video stream is sent by the user device 112 to the core network 104. In additional instances, the downgrading may involve the video privacy engine 140 directing the user device 112 to encode a downgraded video stream instead of the video stream 144. For example, the video privacy engine 140 may direct the user device 112 to use an alternative video encoding scheme that has a lower encoding resolution and/or lower encoding bitrate than the current video encoding scheme.

Regardless of the scheme used to downgrade the video stream 144, the downgraded video stream is eventually sent by the core network 104 to the recipient device. For example, if the recipient device is the user device 116, the core network 104 may send a downgraded video stream 154 to the user device 116 via the base station 106(2). Likewise, if the recipient device is the server 130 of the third-party service provider 132, the core network 104 may send the downgraded video stream 154 to the server 130 via the Internet 110.

However, if the video privacy policy indicates that the recipient device is authorized to receive the video stream 144, the video privacy engine 140 may take no further action, and the video stream 144 is sent by the core network 104 to the recipient device without any modification. For example, if the user device 126 is an authorized recipient device, the video stream 144 may be sent by the core network 104 via the Internet 110 to the user device 126.

In some embodiments, the video privacy engine 140 may send a warning notification to the user device 112 instead of automatically initiating the downgrade of the video stream 144 when a recipient device is found to be unauthorized to receive the video stream 144. The warning notification may cause the media application 120 on the user device 112 to present a warning indication to the user 114. The warning indication may notify the user 114 that the video stream 144 transmitted by the user device 112 is capable of being used for behavioral biometric analysis. Further, the warning indication may prompt the user 114 to select whether to proceed with sending the video stream 144 or a downgraded version of the video stream 144 to the recipient device. Subsequently, the media application 120 may communicate the selection to the video privacy engine 140. In turn, the video privacy engine 140 may initiate a downgrade of the video quality of the video stream 144 if the selection is for sending a downgraded version of the video stream 144. However, if the selection is for sending the video stream 144, the video privacy engine 140 may take no further action and the core network 104 may send the video stream 44 to the recipient device.

In other embodiments, the video privacy policy may alternatively or concurrently control whether the user device 112 is permitted to capture and store video streams with video qualities that are susceptible to behavioral biometric analysis. In such embodiment, the media application 120 may determine that the video stream 144 is being encoded for image signals captured by a camera of the user device 112. Accordingly, the media application 120 may analyze the video stream 144 to determine whether it is of sufficiently high video quality to be susceptible to behavioral biometric analysis. Thus, if the video stream 144 is determined to be susceptible to behavioral biometric analysis, the media application 120 may request the video privacy engine 140 to access the video privacy policy established for the user device 112. The video privacy policy is then used by the video privacy engine 140 to determine whether the user device 112 is permitted to capture and store the susceptible video stream on the user device 112. Thus, when the user device 112 is not permitted to capture and store the video stream 144, the video privacy engine 140 may direct the media application 120 to downgrade the video quality of the video stream 144. In various embodiments, the media application 120 may re-encode the video stream 144 into a downgraded video stream with lower video quality, in which the downgraded video stream is not susceptible to behavioral biometric analysis.

The media application 120 may further encode any new image signals captured by the camera of the user device 112 for the video stream 144 at the lower video quality. The downgrading may be implemented in the same manner as with respect to the scenario above in which the video stream 144 is transmitted to a recipient device. On the other hand, if the user device 112 is permitted to capture and store the video stream 144, the media application 120 may take no further action that hinders the capture and storage of the video stream 144 in a data store of the user device 112.

In some alternative embodiments, the media application 120 may present a warning indication on the user device 112 instead of automatically initiating the downgrade of the video stream 144 when the user device 112 is not permitted to capture and store the video stream 144. The warning indication may notify the user that the video stream 144 being captured and stored is capable of being used for behavioral biometric analysis. Further, the warning indication may prompt the user 114 to select whether to proceed with capturing and storing the video stream 144 or capturing and storing a downgraded version of the video stream 144. Subsequently, if the selection is for capturing and storing a downgraded version of the video stream 144, the media application 120 may initiate the capture and storage of a downgrade video stream in place of the video stream 144. However, if the selection is for capturing and storing the video stream 144, the media application 120 may take no further action that hinders the capture and storage of the video stream 144 in the data store of the user device 112.

Example User Device Components

Figure 2:
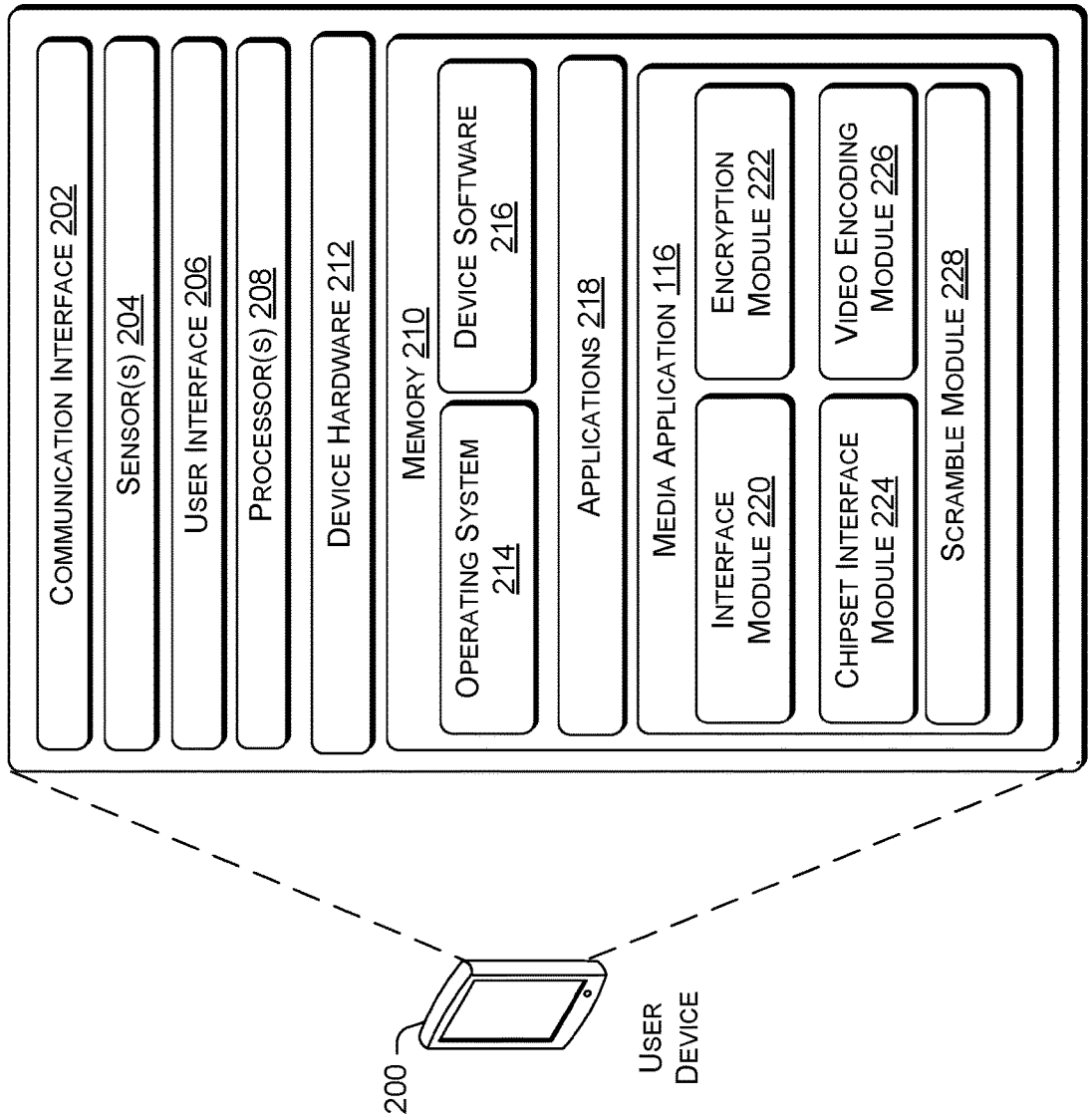
FIG. 2 is a block diagram showing various components of a user device that interfaces with a video privacy engine of a wireless carrier network that protects video streams of subscribers from unwanted behavioral biometric analysis.

FIG. 2 is a block diagram showing various components of a user device that interfaces with a video privacy engine of a wireless carrier network that protects subscribers from unwanted behavioral biometric analysis. The user device 200 may include a communication interface 202, one or more sensors 204, a user interface 206, one or more processors 208, memory 210, and device hardware 212. In at least one example, the one or more processors 208 may include one or more central processing units (CPUs), one or more graphics processing units (GPUs), and/or any other processing units. Each of the one or more processors 208 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution. The communication interface 202 may include wireless and/or wired communication components that enable the user device 200 to transmit or receive voice or data communication via the wireless carrier network 102, as well as other telecommunication and/or data communication networks. The sensors 204 may include a proximity sensor, a compass, an accelerometer, biometric sensors, cameras, and/or a global positioning system (GPS) sensor, among other appropriate sensors. The proximity sensor may detect movement of objects that are proximate to the user device 200. The compass, the accelerometer, and the GPS sensor may detect orientation, movement, and geolocation of the user device 200. The cameras may capture images of the environment around the user device 200.

The user interface 206 may enable a user to provide input and receive output from the user device 200. The user interface 206 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 210 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 212 may include a modem that enables the user device 200 to perform telecommunication and data communication with the wireless carrier network 102. The device hardware 212 may further include signal converters, antennas, hardware decoders and encoders, graphic processors, a universal integrated circuit card (UICC) or an embedded UICC (eUICC), and/or the like that enable the user device 200 to execute applications and provide telecommunication and data communication functions. In some embodiments, the device hardware 212 may include an artificial intelligence (AI) chipset that is capable of performing various high-level machine-learning and analytic functions, such as behavioral biometric analysis.

The one or more processors 208 and the memory 210 of the user device 200 may implement an operating system 214, device software 216, one or more applications 218, and the media application 120. Such software may include routines, program instructions, objects, and/or data structures that are executed by the processors 208 to perform particular tasks or implement particular abstract data types.

The operating system 214 may include components that enable the user device 200 to receive and transmit data via various interfaces (e.g., user controls, communication interface 202, and/or memory input/output devices). The operating system 214 may also process data using the one or more processors 208 to generate output based on input that is received via the user interface 206. For example, the operating system 214 may provide an execution environment for the execution of the applications 218. The operating system 214 may include a presentation component that presents the output (e.g., display the data on an electronic display, store the data in memory, transmit the data to another secure endpoint device, etc.).

The operating system 214 may include an interface layer that enables applications to interface with the modem and/or the communication interface 202. The interface layer may comprise public APIs, private APIs, or a combination of both public APIs and private APIs. Additionally, the operating system 214 may include other components that perform various other functions generally associated with an operating system. The device software 216 may include software components that enable the user device 200 to perform functions. For example, the device software 216 may include basic input/output system (BIOS), bootrom, or a bootloader that boots up the user device 200 and executes the operating system 214 following the powerup of the device.

The applications 218 may include applications that provide utility, entertainment, and/or productivity functionalities to a user of the user device 200. For example, the applications 218 may include telephony applications, electronic mail applications, remote desktop applications, web browser applications, navigation applications, office productivity applications, multimedia streaming applications, an online shopping application, and/or so forth.

The media application 120 may include an interface module 220, an encryption module 222, a chipset interface module 224, a video encoding module 226, and a scramble module 228. In various embodiments, the media application 120 may be an over-the-top (OTT) application or a native application of the operating system 214. In various embodiments, the media application 120 may be a video capture application, a web conference application, a social media application, a messaging application, a video chat application, or some other type of application with video capture and/or streaming capabilities. In some embodiments, the media application 120 may be executed by a trusted environment of the user device 200. The trusted environment is an isolated execution space that is provided by dedicated software and/or hardware of a device. For example, the trusted environment may employ a dedicated memory space or memory chip that is not accessible by applications and/or hardware components not located in the dedicated memory space or memory chip, unless such applications and/or hardware components are provided with special access privileges through secure communication channels and APIs. In alternative instances, the applications that reside in the trusted environment may be executed by a dedicated processor. The isolation of the trusted environment provides a high level of security for the execution of code or the processing of data stored in the execution space. The trusted environment may further provide a secure data store for the storage of data files on the user device 200.

The interface module 220 may receive instructions from the video privacy engine 136 and provide requested data to the video privacy engine 136. In various embodiments, the interface module 220 may include multiple application program interfaces (APIs) that can be called by the video privacy engine 136 to perform specific tasks. The instructions may include a command for the video encoding module 226 to encode a video stream using a specific video quality setting (e.g., a specific video resolution and a specific video bitrate) for delivery to the core network 104 of the wireless carrier network 102. The instructions may further include a query to the chipset interface module 224 to determine whether a video of a particular video quality (e.g., a video resolution and/or a video bitrate) is susceptible to behavioral biometric analysis of the content of the video. In turn, the chipset interface module 224 may use the interface module 220 to return a response regarding the susceptibility to the video privacy engine 136.

In additional embodiments, the instructions may direct the interface module 220 to use a user interface of the user device 200 to present a warning notification when the user device is sending a video stream that is susceptible to behavioral biometric analysis. The presentation of the warning notification may be accomplished by a visual notification message that is presented on a display of the user device 200. In some instances, the visual notification message may be accompanied by an audible message that is transmitted via an audio speaker of the user device 200. In some instances, the warning notification that is presented may feature two selection controls (e.g., buttons, checkboxes, etc.). The first selection control may enable a user to provide a first input for continuing with sending the susceptible video stream to a recipient device via the wireless carrier network 102. The second selection control may enable the user to provide a second input for initiating the sending of a corresponding downgraded video stream to the recipient device via the wireless carrier network 102. Thus, depending on the particular input passed by the interface module 220 to the video privacy engine 136, the video privacy engine 136 may send either the susceptible video stream or the corresponding downgraded video stream to the recipient device.

In other instances, the warning notification that is presented may display a default action, an override control (e.g., a button, a checkbox, etc.), and an indication that the default action will be executed if no override input is entered via the override control within a predetermined period of time. In at least one instance, the warning notification may include a countdown timer that counts down to the termination of the predetermined period of time. In one implementation, the default action may be to continue to send the susceptible video stream to a recipient device via the wireless carrier network 102. In another implementation, the default action may be to send a corresponding downgraded video stream to the recipient device via the wireless carrier network 102. Thus, depending on the particular implementation and whether an override input is triggered and provided by the interface module 220 to the video privacy engine 136, the video privacy engine 136 may send either the susceptible video stream or the corresponding downgraded video stream to the recipient device. In further embodiments, the instructions may further include a command for the scramble module 228 to apply a scramble mask to a video stream.

The encryption module 222 may encrypt a video stream or a downgraded video stream prior to sending the stream to a recipient device via the wireless carrier network 102. The encryption module 222 may perform the encryption using an encryption key that is issued by the video privacy engine 140. The encryption key may be issued by the video privacy engine 140 following a registration of the user device 200 with the video privacy engine 140. In various embodiments, the encryption key may be an encryption key of a symmetric key pair or an asymmetric key pair.

The chipset interface module 224 may interface with the AI chipset that is capable of executing behavioral biometric analysis algorithms on video streams stored or transferred by the user device 200. In this way, the video privacy engine 140 may query the AI chipset to determine whether a video stream originating from the user device is susceptible to behavioral biometric analysis. In some embodiments, the chipset interface module 224 may trigger the AI chipset to determine whether a video segment of a video stream is of sufficiently high video quality for the performance of behavioral biometric analysis and return a determination made by the AI chipset to the video privacy engine 140 via the chipset interface module 224 and the interface module 220. For example, the AI chipset may generate a null value if the video quality of the video segment does not support behavioral biometric analysis, or generate a designated value (e.g., "1") if the video quality of the video segment is susceptible to behavioral biometric analysis.

The video quality of a video stream may be determined to be sufficiently high for the performance of behavioral biometric analysis when the video quality of the video stream meets or exceeds a video quality threshold. The video quality threshold may include a video resolution threshold component and a video bitrate threshold component. For example, the video quality threshold may specify that video streams with a video resolution at or higher than 1920×1080 and a video bitrate at or higher than 4,000 kbps are usable for behavioral biometric analysis. In another example, the video quality threshold may specify that video streams with a video resolution at or higher than 3840×2160 and a video bitrate at or higher than 8,000 kbps are usable for behavioral biometric analysis. However, in alternative instances, the video quality threshold may be solely a video resolution threshold.

In other embodiments, the chipset interface module 224 may trigger the AI chipset to execute a behavioral biometric analysis algorithm on a video segment of the video stream to determine whether a sufficient number of behavioral biometric characteristics of a person can be detected in the video segment. The ability to detect the sufficient number of behavioral biometric characteristics may be an indication that behavioral biometric analysis may be performed on the video stream. Accordingly, in such embodiments, the video quality threshold may be a predetermined number of behavioral biometric characteristics. Thus, the video quality of the video stream may be determined to have met the video quality threshold when at least the predetermined number of behavioral biometric characteristics of a person are detected in the video content of the video stream. The AI chipset may generate a null value if no behavioral biometric analysis may be performed on the video segment (e.g., the video quality threshold is not met), or generate a designated value (e.g., "1") if behavioral biometric analysis may be performed on the video segment (e.g., the video quality threshold is met).

The video encoding module 226 may use the processors 208 of the user device 200 (e.g., the GPUs) to encode image signals captured by a camera of the user device 200 into video streams. The encoded video streams may vary in video qualities. For example, a highest quality 4K video stream may have a video resolution of 3840×2160 and a video bitrate of 8,000-14,000 kilobits per second (kbps), a lower quality High Definition (HD) 1080 video stream may have a video resolution of 1920×1080, and a video bitrate of 4,000-8,000 kbps, and a still lower quality HD 720 video stream may have a video resolution of 1300×720, and a video bitrate of 1,500-4,000 kbps. Thus, a lower quality video stream may have a lower video resolution and/or a lower video bitrate than a higher quality video stream. For example, a lower quality video stream may have a lower video resolution but the same video bitrate as the higher quality video stream, or both a lower video resolution and a lower video bitrate than the higher quality video stream. In some embodiments, the video encoding module 226 may be capable of dynamically adjusting the video quality of an encoded video stream based on various parameters, such as available processing power, available storage memory, available network bandwidth, and/or so forth. However, the video encoding module 226 may be directed by the video privacy engine 140 through the interface module 220 to use one or more specific video quality settings (e.g., a specific video resolution and/or a specific video bitrate) to encode or re-encode a video stream.

In other embodiments, the video encoding module 226 may be configured to determine whether a video stream being encoded is susceptible to behavioral biometric analysis. The video encoding module 226 may make such a determination when the module is activated to encode image signals into the video stream. In some instances, the video encoding module 226 may determine that the video stream is susceptible when the video quality being used to encode the video stream meets or exceeds a video quality threshold for behavioral biometric analysis. The video quality threshold may include a video resolution threshold component and a video bitrate threshold component. For example, the video quality threshold may specify that video streams with a video resolution at or higher than 1920×1080 and a video bitrate at or higher than 4,000 kbps are usable for behavioral biometric analysis. In another example, the video quality threshold may specify that video streams with a video resolution at or higher than 3840×2160 and a video bitrate at or higher than 8,000 kbps are usable for behavioral biometric analysis. However, in alternative instances, the video quality threshold may solely be a video resolution threshold. In other instances, the video encoding module 226 may use the chipset interface module 224 to trigger the AI chipset to make the determination.

Thus, if the video stream is determined to be susceptible to behavioral biometric analysis, the video encoding module 226 may request the video privacy engine 140 to access the video privacy policy established for the user device 112. The video privacy policy is then used by the video privacy engine 140 to determine whether the user device 110 is permitted to capture and store the susceptible video stream on the user device 112. Thus, when the user device 112 is not permitted to capture and store the video stream 144, the video privacy engine 140 may direct the video encoding module 226 to downgrade the video quality of the video stream. In various embodiments, the media application 120 may re-encode the video stream into a downgraded video stream with a lower video quality, in which the downgraded video stream is not susceptible to behavioral biometric analysis. The video encoding module 226 may further encode any new image signals captured by the camera of the user device 112 for the video stream at the lower video quality. The downgrading may be accomplished by using an encoding scheme with a lower video resolution, or a combination of a lower video resolution and a lower video bitrate that does not support behavioral biometric analysis. Alternatively, or concurrently, the downgrading may be accomplished by applying a scramble mask to the video stream. On the other hand, if the user device 112 is permitted to capture and store the video stream 144, the video encoding module 226 may capture and store the original video stream in the data store of the user device 112.

In some alternative embodiments, the media application 120 may present a warning indication on the user device 112 instead of automatically initiating the downgrade of the video stream 144 when the user device 112 is not permitted to capture and store the video stream. The warning indication may notify the user that the video stream 144 being captured and stored is capable of being used for behavioral biometric analysis. Further, the warning indication may prompt the user 114 to select whether to proceed with capturing and storing the video stream or capturing and storing a downgraded version of the original video stream. The presentation of the warning notification may be accomplished by a visual notification message that is presented on a display of the user device 200. In some instances, the visual notification message may be accompanied by an audible message that is transmitted via an audio speaker of the user device 200.

In some instances, the warning notification that is presented may feature two selection controls (e.g., buttons, checkboxes, etc.). The first selection control may enable a user to provide a first input for continuing with capturing and storing the video stream. The second selection control may enable the user to provide a second input for initiating the capture and storage of a corresponding downgraded version of the video stream. Thus, depending on the particular input, the video encoding module 226 may capture and store either the video stream or the downgraded video stream.

In other instances, the warning notification that is presented may display a default action, an override control (e.g., a button, a checkbox, etc.), and an indication that the default action will be executed if no override input is entered via the override control within a predetermined period of time. In at least one instance, the warning notification may include a countdown timer that counts down to the termination of the predetermined period of time. In one implementation, the default action may be to continue to capture and store the video stream in the data store of the user device. In another implementation, the default action may capture and store a corresponding downgraded video stream in the data store of the user device.

Subsequently, if a selection for capturing and storing a downgraded version of the video stream is received by the video encoding module 226, the video encoding module 226 may initiate the capture and storage of a downgrade video stream in place of the video stream. However, if the selection is for capturing and storing the video stream, the video encoding module 226 may capture and store the video stream in the data store of the user device 112. In some other implementations, the video encoding module 226 may be a part of another application (e.g., a camera application) on the user device or a part of the operating system 214, rather than a part of the media application 120.

The scramble module 228 may be directed by the video privacy engine 140 to apply a scramble mask to the video content of a video stream. The application of the scramble mask may introduce video artifacts or noise that obscures or blurs some image details in the video content of a video stream. Alternatively, or concurrently, the application of the scramble mask may reduce the brightness, contrast, saturation, and/or sharpness of the images in the video stream. Accordingly, the application of the scramble mask to a video stream may reduce the video quality of the video stream.

Example Computing Node Components

Figure 3:
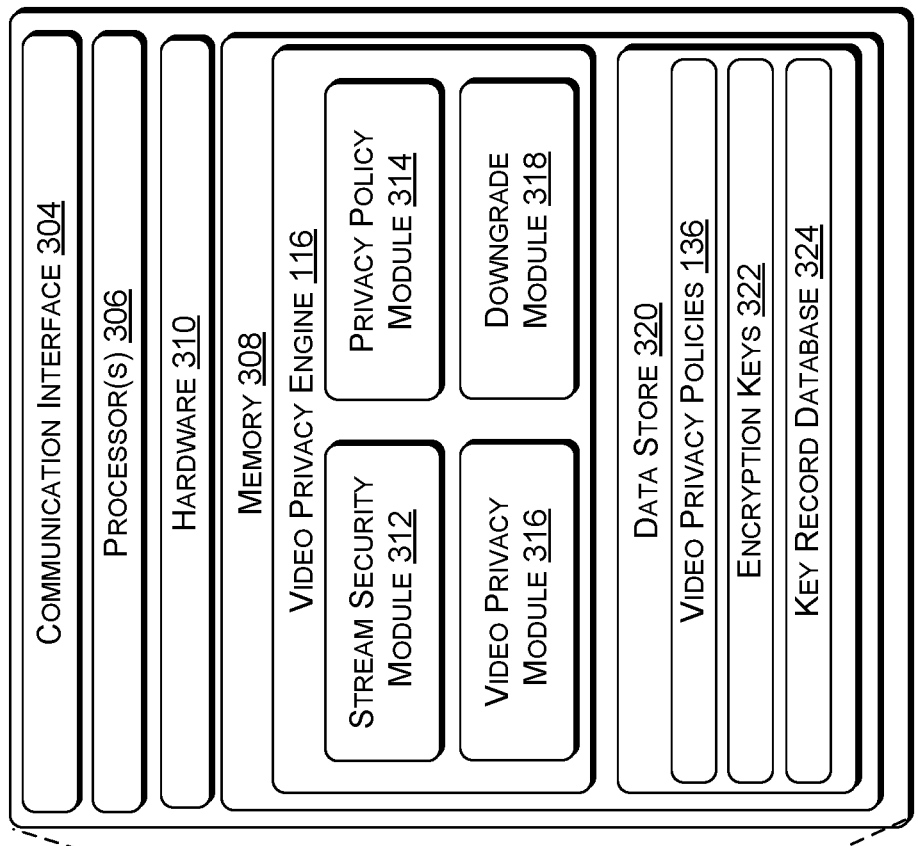
FIG. 3 is a block diagram showing various components of one or more illustrative computing nodes that implement a video privacy engine of a wireless carrier network that protects video streams of subscribers from unwanted behavioral biometric analysis.

FIG. 3 is a block diagram showing various components of one or more illustrative computing nodes that implement a video privacy engine of a wireless carrier network that protects subscribers from unwanted behavioral biometric analysis. The video privacy engine 140 may be implemented by the computing nodes 300. The computing nodes 300 may include a communication interface 304, one or more processors 306, and memory 308. The communication interface 304 may include wireless and/or wired communication components that enable the one or more computing nodes 300 to transmit data to and receive data from other networked devices. The computing nodes 300 may be accessed via hardware 310. The hardware 310 may include additional user interface, data communication, or data storage hardware. For example, the user interface may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 308 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The video privacy engine 140 may be stored in the memory 308. The video privacy engine 140 may include a stream security module 312, a privacy policy module 314, a video privacy module 316, and a downgrade module 318. The modules may include routines, program instructions, objects, and/or data structures that perform particular tasks or implement particular abstract data types. The memory 308 may be further configured to implement a data store 320.

The stream security module 312 may distribute encryption keys 322 to computing devices that such a pair of computing devices may respectively send and receive a video stream that is encrypted. In order to receive an encryption key, a computing device may send a registration request that includes a device identifier of the computing device to the stream security module 312. In some embodiments, the registration request may further include an authorization code that is distributed by the video privacy engine 140 in advance to the user device. Accordingly, the stream security module 312 may use the authorization code to determine that the computing is authorized to register with the stream security module 312. In some instances, the registration request may include information regarding the computing device. For example, the information may include device model information, device manufacturer information, device type information, identification information of the operator, contact information of the operator, billing information of the operator, and/or so forth. Once a computing device is registered, the stream security module 312 may issue an encryption key to the computing device.

In various embodiments, the stream security module 312 may maintain a key record database 324 that stores the encryption keys distributed to the computing devices. The key record database 324 may contain metadata that records, for each encryption key, a corresponding device identifier of a computing device, time and date of distribution, the device type of the computing device, the model and manufacturer information for the computing device, the operator identification information of the computing device (e.g. a uniform resource locator (URL)), the network identifier (e.g., an IP address) associated with the computing device, and/or so forth. The key records database may be stored in the data store 320. The privacy policy module 314 may provide an online portal that enables subscribers to upload or modify video privacy policies. For example, the online portal may be accessed via a dashboard website or a client application on a user device. The privacy policy module 314 may store the inputted or modified data protection policies in the policy database 148.

The video privacy module 316 may monitor the incoming video streams from computing devices. In various embodiments, the video privacy module 316 may interface with the EPC or the IMS core to monitor and analyze the data packets corresponding to the video streams. For example, the video privacy module 316 may use port mirroring to perform deep packet inspection (DPI) of the data packets in the video streams. Such monitoring and analysis are conducted by the video privacy module 316 to determine whether the video quality of a video stream is sufficient highly for performing behavioral biometric analysis. In some embodiments, the video privacy module 316 may obtain the video quality information (e.g., video resolution, video bitrate, etc.) from the data packets of a video stream. For example, the video quality information may be obtained from a signal data packet, a data packet header of a data packet, by analyzing packet flow, and/or so forth. Subsequently, the video privacy module 316 may determine whether the video quality of the video stream meets or exceeds a video quality threshold for behavioral biometric analysis. The video quality threshold may include a video resolution threshold component and a video bitrate threshold component. For example, the video quality threshold may specify that video streams with a video resolution at or higher than 1920×1080 and a video bitrate at or higher than 4,000 kbps are usable for behavioral biometric analysis. In another example, the video quality threshold may specify that video streams with a video resolution at or higher than 3840×2160 and a video bitrate at or higher than 8,000 kbps are usable for behavioral biometric analysis. Accordingly, a video stream from an originating user device with a video quality that at least meets the video quality threshold is determined by the video privacy module 316 to be susceptible to behavioral biometric analysis.

In other embodiments, the video privacy module 316 may execute a behavioral biometric analysis algorithm on a video segment of a video stream to determine whether a sufficient number of behavioral biometric characteristics of a person can be detected in the video segment. The ability to detect the sufficient number of behavioral biometric characteristics may indicate that the video stream is susceptible to behavioral biometric analysis. Accordingly, in such embodiments, the video quality threshold may be a predetermined number of behavioral biometric characteristics. Thus, the video quality of the video stream may be determined to have met the video quality threshold when at least the predetermined number of behavioral biometric characteristics of a person is detected in the video content of the video stream. In still other embodiments, the video privacy module 316 may query a media application on a user device that originated the video stream for an indication of whether the video stream is susceptible to behavioral biometric analysis.

Following a determination that a video stream from an originating user device is susceptible to behavioral biometric analysis, the video privacy module 316 may determine whether a corresponding video privacy policy permits the transmission of the video stream to the intended recipient device of the stream. In various embodiments, the video privacy module 316 may identify the originating user device and the recipient device based on information in the data packets of the video stream. For example, the video privacy module 316 may extract an originating IP address or an originating device identifier (e.g., an IMEI) from the data packets of the video stream. Such information is then used by the video privacy module 316 to retrieve a corresponding video privacy policy that applies to the originating user device from the policy database 148. For example, the video privacy module 316 may use a lookup table provided by a Mobility Management Entity (MME), a Policy and Charging Rules Function (PCRF), or another similar entity or function to translate the originating IP address into a device identifier, and then retrieve the corresponding video privacy policy using the device identifier. Likewise, the video privacy module 316 may extract a destination IP address of the video stream. In some instances, the video privacy module 316 may translate the destination IP into a destination device identifier or look up operator identification information (e.g., an URL) based on information in one or more databases of the wireless carrier network (e.g., key record database 324).

Similarly, the destination IP address may be further used by the video privacy module 316 to locate device model information, device manufacturer information, and/or device type information for the recipient device.

Subsequently, the video privacy module 316 may determine whether the video privacy policy permits the recipient device to receive the video stream. In some instances, the video privacy policy may only permit specific destination IP addresses or URLs to receive a video stream that is susceptible to behavioral biometric analysis. In other instances, the video privacy policy may only permit devices with specific identifiers, device models, and/or device types to receive a video stream that is susceptible to behavioral biometric analysis. Accordingly, if the video privacy module 316 determines that the recipient device is not permitted to receive the video stream by the video privacy policy, the video privacy module 316 may direct the downgrade module 318 to generate a downgraded video stream to be sent in place of the video stream. However, if the video privacy module 316 determines that the recipient device is permitted to receive the video stream, the video privacy module 316 may take no further action that interferes with the delivery of the video stream to the recipient device. In alternative embodiments, the video privacy module 316 may be configured to send a warning notification to the originating user device when the recipient device is not permitted to receive the video stream by the video privacy policy. In such embodiments, whether or not the video privacy module 316 directs the downgrade module 318 to generate a downgraded video stream may be dependent on the response received from the user device following the warning notification.

In additional embodiments, the video privacy module 316 may receive a request from a user device to determine whether the user device is permitted to capture and store a video stream that is susceptible to behavioral biometric analysis. The request may include a device identifier (e.g., an IMEI) of the user device, or an originating IP address of the user device that can be translated into the device identifier. The device identifier is then used by the video privacy module 316 to retrieve a corresponding video privacy policy from the policy database 148. Accordingly, the video privacy module 316 may use the corresponding video privacy policy to determine whether the user device is permitted to capture and store the susceptible video stream and send the appropriate indication to the user device. For example, the video privacy module 316 may send a first indicator value to the user device if the susceptible video stream is permitted, or alternatively send a second indicator value to the user device if the susceptible video stream is not permitted.

The downgrade module 318 may downgrade the video quality of a video stream in response to a request from the video privacy module 316 to generate a downgraded video stream. In some embodiments, the downgrade module 318 may direct encoding application at the edge server of a base station (e.g., the encoding application 150 of the edge server 152) to intercept the video stream, buffer the video stream in a data cache, and then re-encode the buffered video stream into a downgraded video stream with a lower video quality. The encoding application may use a specified lower video quality (e.g., a lower video resolution and/or a lower video bitrate) that is known to not support behavioral biometric analysis to re-encode the video stream. Accordingly, the downgraded video stream may have a lower video resolution and/or a lower video bitrate than the original video stream. Alternatively, or concurrently, the encoding application may apply a scramble mask to the buffered video stream in order to generate the downgraded video stream. In some instances, the application of the scramble mask may introduce video artifacts or noise that obscures or blurs some image details in the video content of a video stream. In other instances, the application of the scramble mask may alternatively or concurrently reduce the brightness, contrast, saturation, and/or sharpness of the images in the video stream. The downgrade video stream is then delivered by the base station to the core network 104 in place of the original video stream.

In other embodiments, the downgrade module 318 may be configured with an encoding application. In such embodiments, the downgrade module 318 may intercept the video stream by re-routing the video stream into a stream buffer, and then applying the encoding application to the buffered video stream to generate a downgraded video stream with a lower video quality in a similar manner. Alternatively, or concurrently, the encoding application of the downgrade module 318 may apply a scramble mask to the buffered video stream in order to generate the downgraded video stream. The downgrade video stream is then delivered by the downgrade module 318 to the EPC or the IMS core of the core network 104 for sending to the recipient device.

In additional embodiments, the downgrade module 318 may direct a video encoding module (e.g., video encoding module 226) on the originating user device to re-encode the video stream into a downgraded video stream having lower video quality. The re-encoding may be accomplished using a specified video quality (e.g., a lower video resolution, or a combination of a lower video resolution and a lower video bitrate) that is known to not support behavioral biometric analysis to re-encode the video stream. The downgraded video stream is then sent by the originating user device to the core network 104 of the wireless carrier network 102 for delivery to the recipient device.

Example Processes

Figure 4:
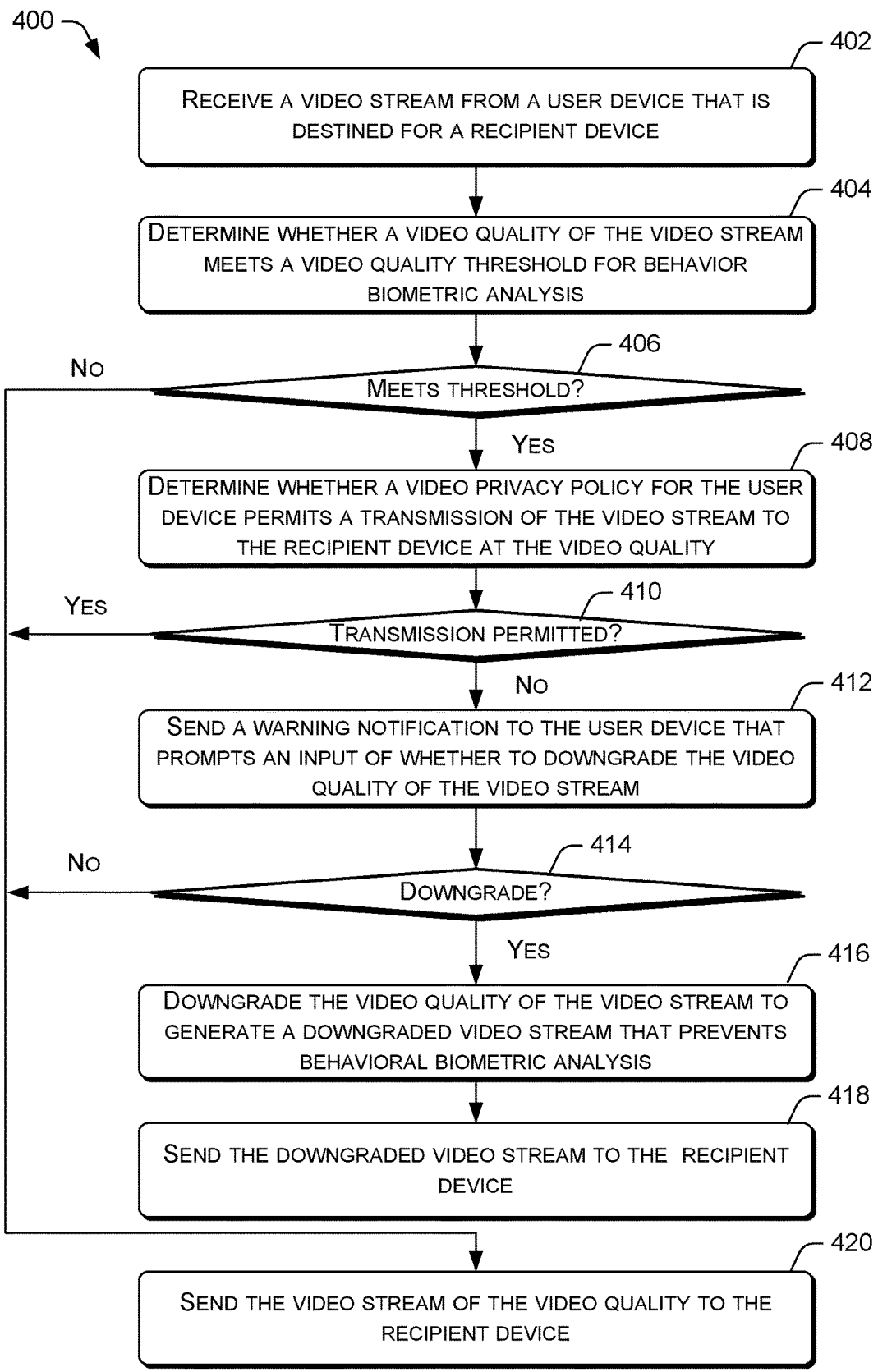
FIG. 4 is a flow diagram of an example process for a wireless carrier network to use a video privacy policy to protect video streams of a subscriber from unwanted behavioral biometric analysis.
Figure 5:
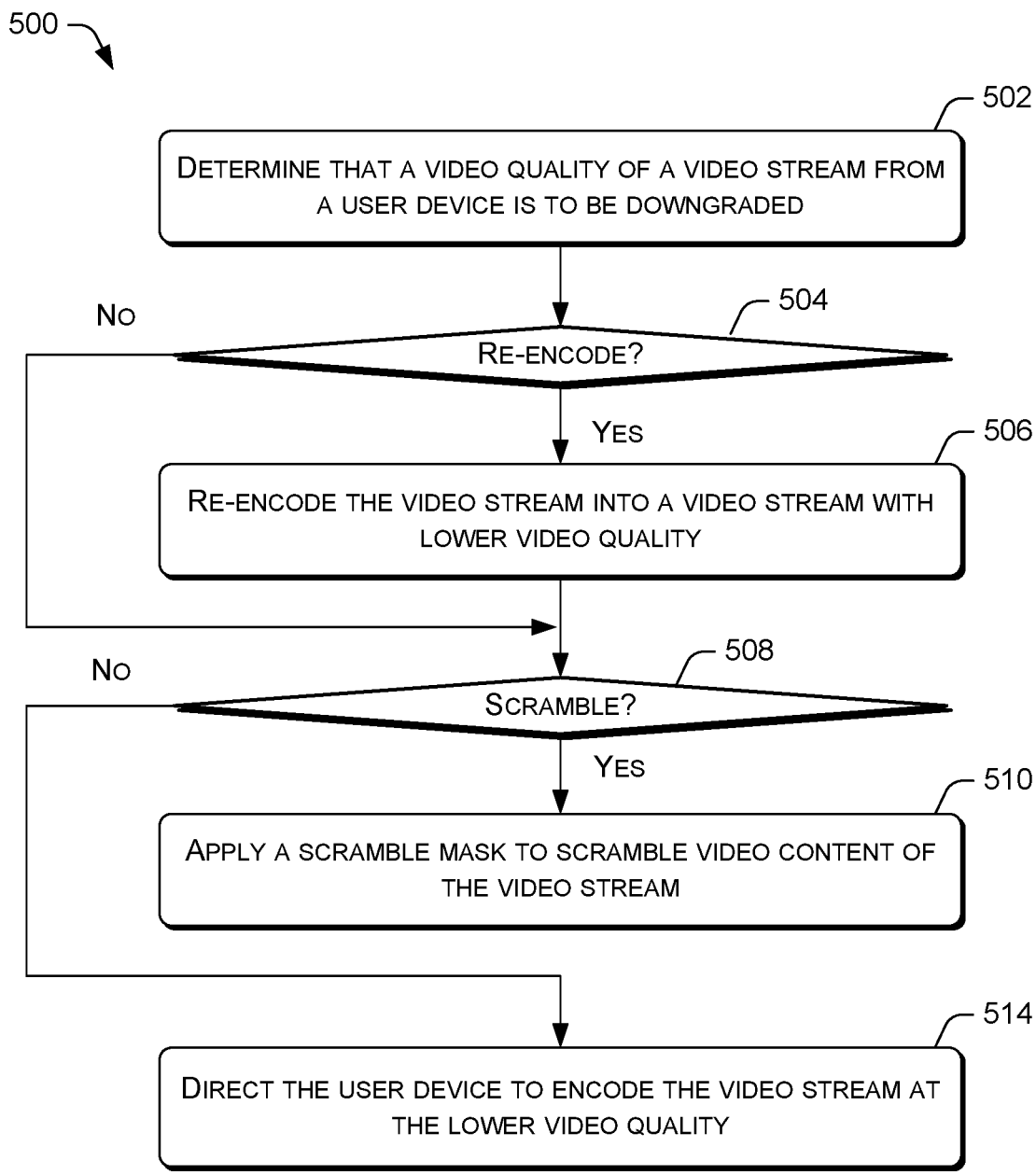
FIG. 5 is a flow diagram of an example process for a wireless carrier network to implement protection of a video stream from unwanted behavioral biometric analysis.
Figure 6:
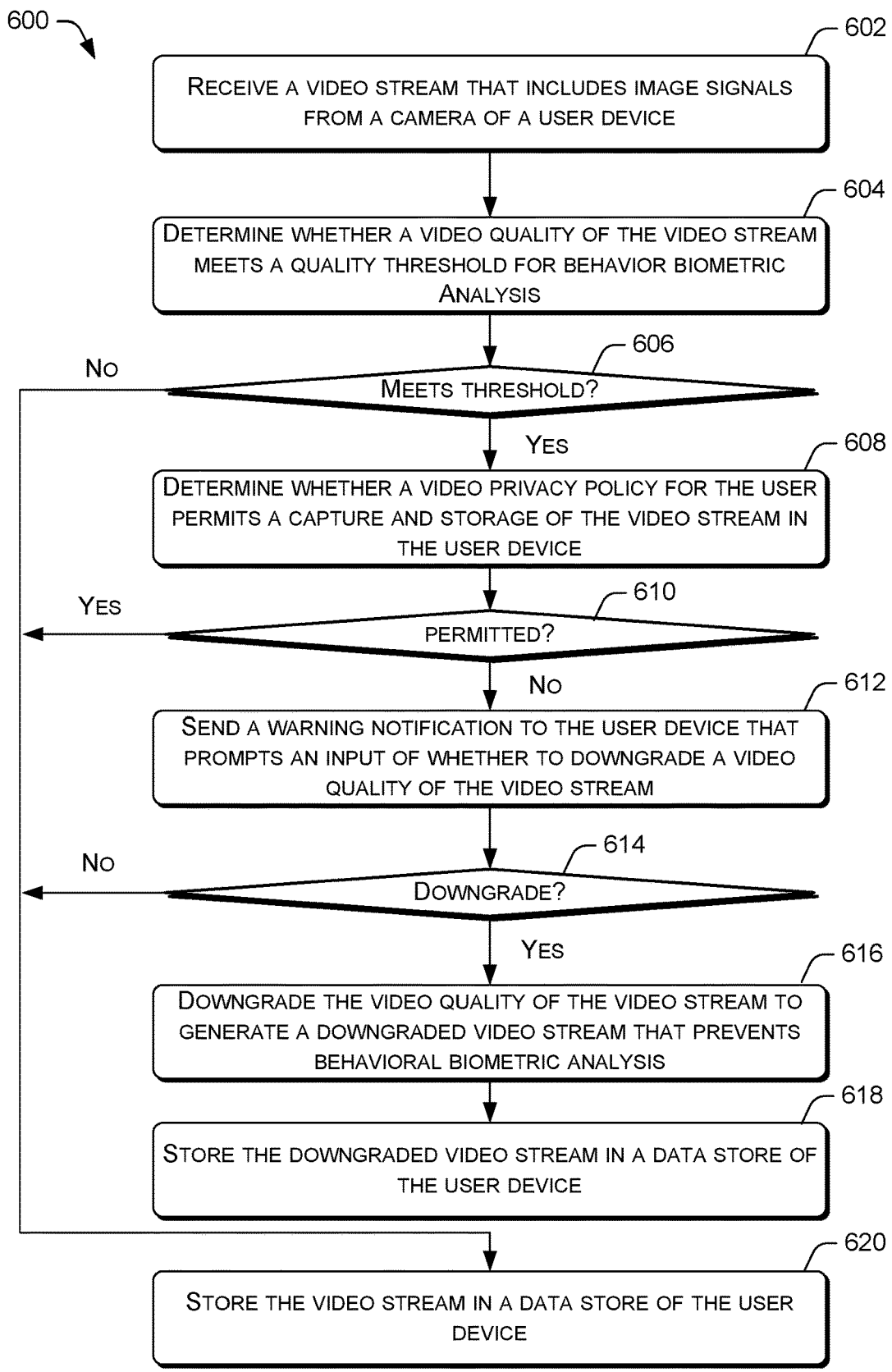
FIG. 6 is a flow diagram of an example process for a wireless carrier network to use a video privacy policy to prevent the storage of video data that are susceptible to behavioral biometric analysis on a user device.

FIGS. 4-6 present illustrative processes 400-600 that may be implemented by a wireless carrier network to protect video data of subscribers from unwanted behavioral biometric analysis. Each of the processes 400-600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-600 are described with reference to the architecture 100 of FIG. 1.

FIG. 4 is a flow diagram of an example process 400 for a wireless carrier network to use a video privacy policy to protect video streams of a subscriber from unwanted behavioral biometric analysis. At block 402, the core network 104 of the wireless carrier network 102 may receive a video stream from a user device that is destined for a recipient device. In various embodiments, the user device may send the video stream to the core network 104 of the wireless carrier network 102. The video stream may include encoded image signals captured by a camera of the user device.

At block 404, the video privacy engine 140 at the core network 104 may determine whether a video quality of the video stream at least meets a video quality threshold for behavioral biometric analysis. In various embodiments, the video privacy engine 140 may monitor and analyze the data packets of the video stream to determine the video quality of the video stream. In some instances, the video quality threshold may include a video resolution threshold or a combination of a video resolution threshold and a video bitrate threshold. In other instances, the video quality threshold may be a predetermined number of detected behavioral biometric characteristics. At decision block 406, if the video quality of the video stream at least meets the video quality threshold ("yes" at decision block 406), the process 400 may proceed to block 408.

At block 408, the video privacy engine 140 may determine whether a video privacy policy for the user device permits transmission of the video stream to the recipient device at the video quality. For example, a video privacy policy may indicate which recipient devices are allowed to access video streams from the user device, the recipient devices may be identified by device identifiers, destination IP addresses, device type, operator identifiers, and/or so forth. At decision block 410, if the transmission to the recipient device is not permitted ("no" at decision block 410), the process 400 may proceed to block 412.

At block 412, the video privacy engine 140 may send a warning notification to the user device that prompts an input of whether to downgrade the video quality of the video stream. The presentation of the warning notification by the user device may be accomplished by a visual notification message that is presented on a display of the user device. In some instances, the visual notification message may be accompanied by an audible message that is transmitted via an audio speaker of the user device. The warning notification may prompt a user of the user device to input a selection as to whether the video quality is to be downgraded.

At decision block 414, if the video privacy engine 140 receives an input to downgrade the video quality of the video stream ("yes" at decision block 414), the process 400 may proceed to block 416. At block 416, the video privacy engine 140 may downgrade the video quality of the video stream to generate a downgraded video stream that prevents behavioral biometric analysis. In various embodiments, the downgrade of the video quality may involve re-encoding the video stream, applying a scramble mask, and/or so forth. At block 418, the core network 104 may send the downgraded video stream to the recipient device.

Returning to decision block 406, if the video quality of the video stream does not meet the video quality threshold ("no" at decision block 406), the process 400 may proceed to block 420. At block 418, the core network 104 may send the video stream of the video quality to the recipient device. Returning to decision block 410, if the transmission to the recipient device is permitted ("yes" at decision block 410), the process 400 may also proceed to block 420. Returning to decision block 414, if the video privacy engine 140 receives an input to not downgrade the video quality of the video stream ("no" at decision block 414), the process 400 may also proceed to block 420.

FIG. 5 is a flow diagram of an example process 500 for a wireless carrier network to implement protection of a video stream from unwanted behavioral biometric analysis. At block 502, the video privacy engine 140 may determine that a video quality of a video stream from a user device is to be downgraded. At decision block 504, the video privacy engine 140 may determine whether the downgrade includes re-encoding the video stream. In various embodiments, the video privacy engine 140 may make such a determination based on a corresponding video privacy policy for the user device. Thus, if the video privacy engine 140 determines that the video stream is to be re-encoded ("yes" at decision block 504), the process 500 may proceed to block 506. At block 506, the video privacy engine 140 may re-encode the video stream into a video stream with a lower video quality. The re-encoding may be accomplished using a video quality specified by the video privacy policy (e.g., a lower video resolution, or a combination of a lower video resolution and a lower video bitrate) that is known to not support behavioral biometric analysis.

At decision block 508, the video privacy engine 140 may determine whether the downgrade includes scrambling the video stream based on the corresponding video privacy policy. Thus, if the video privacy engine 140 determines a scramble mask is to be applied to the video stream ("yes" at decision block 508), the process 500 may proceed to block 510. At block 510, the video privacy engine 140 may apply a scramble mask to scramble video content of the video stream. The use of the scramble mask may introduce video artifacts or noise that obscures or blurs some image details in the video stream, thereby lowering the video quality video stream. However, if the video privacy engine 140 determines a scramble mask is not to be applied to the video stream ("no" at decision block 508), the process 500 may proceed to block 514. At block 514, the video privacy engine 140 may direct the user device to encode the video stream at the lower video quality. The encoding may be accomplished using a lower video quality specified by the video privacy policy (e.g., a lower video resolution and a lower video bitrate) that is known to not support behavioral biometric analysis. However, in some instances, the video privacy engine 140 may further apply a scramble mask to the video stream with the lower video quality. Returning to decision block 504, if the video privacy engine 140 determines that the video stream is not to be re-encoded ("no" at decision block 504), the process 500 may proceed to decision block 508.

FIG. 6 is a flow diagram of an example process 600 for a wireless carrier network to use a video privacy policy to prevent the storage of video data that are susceptible to behavioral biometric analysis on a user device. At block 602, a media application on the user device may receive a video stream that includes image signals from a camera of the user device. In various embodiments, the video stream may be generated by a video encoding algorithm that encodes image signals from the camera into the video stream.

At block 604, the media application on the user device may determine whether a video quality of the video stream as captured by the camera of the user device at least meets a video quality threshold for behavioral biometric analysis. In various embodiments, the video privacy engine 140 may monitor and analyze the data packets of the video stream to determine the video quality of the video stream. In some instances, the video quality threshold may include a video resolution threshold or a combination of a video resolution threshold and a video bitrate threshold. In other instances, the video quality threshold may be a predetermined number of detected behavioral biometric characteristics. At decision block 606, if the video quality of the video stream at least meets the video quality threshold ("yes" at decision block 606), the process 600 may proceed to block 608. At block 608, the media application may ask the video privacy engine 140 of the core network 104 to determine whether a video privacy policy for the user device permits capture and storage of the video stream with the video quality in a data store of the user device. At decision block 610, if the capture and storage of the video stream are not permitted ("no" at decision block 610), the process 600 may proceed to block 612.

At block 612, the media application may send a warning notification to the user device that prompts an input of whether to downgrade the video quality of the video stream. The presentation of the warning notification by the user device may be accomplished by a visual notification message that is presented on a display of the user device. In some instances, the visual notification message may be accompanied by an audible message that is transmitted via an audio speaker of the user device. The warning notification may prompt a user of the user device to input a selection as to whether the video quality is to be downgraded.

At decision block 614, if the media application receives an input to downgrade the video quality of the video stream ("yes" at decision block 614), the process 600 may proceed to block 616. At block 616, the media application may downgrade the video quality of the video stream to generate a downgraded video stream that prevents behavioral biometric analysis. In various embodiments, the downgrade of the video quality may involve re-encoding the video stream, applying a scramble mask, and/or so forth, similar to the process described in FIG. 5. At block 618, the media application may store the downgraded video stream in a data store of the user device.

Returning to decision block 606, if the video quality of the video stream does not meet the video quality threshold ("no" at decision block 606), the process 600 may proceed to block 620. At block 620, the media application may store the video stream in a data store of the user device. Returning to decision block 610, if the capture and storage of the video stream are permitted ("yes" at decision block 610), the process 600 may also proceed to block 620. Returning to decision block 614, if the media application receives an input to not downgrade the video quality of the video stream ("no" at decision block 614), the process 600 may also proceed to block 620.

The techniques may enable an MNO to protect the privacy of subscribers as the subscribers capture, upload, or stream video footages through the wireless carrier network of the MNO. In this way, rather than merely acting as a communication conduit for subscriber data, the MNO may play a key role in protecting the privacy of its subscribers.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of a core network of a wireless carrier network storing computer-executable instructions that upon execution cause one or more computing nodes to perform acts comprising:
receiving a video stream from a user device that is destined for a recipient device at the core network of the wireless carrier network, the video stream having a video quality that at least meets a quality threshold for behavioral biometric analysis;
determining whether a video privacy policy for the user device permits transmission of the video stream of the video quality to the recipient device;
in response at least to the video privacy policy not permitting the transmission of the video stream of the video quality, downgrading the video quality of the video stream to generate a downgraded video stream that prevents behavioral biometric analysis and transmitting the downgraded video stream to the recipient device; and
in response to the video privacy policy permitting the transmission of the video stream of the video quality, transmitting the video stream of the video quality to the recipient device.

2. The one or more non-transitory computer-readable media of claim 1, wherein the acts further comprise determining that the video quality of the video stream at least meets the quality threshold when a video resolution of the video stream at least meets a video resolution threshold.

3. The one or more non-transitory computer-readable media of claim 1, wherein the acts further comprise determining that the video quality of the video stream at least meets the quality threshold at least when a video resolution of the video stream at least meets a video resolution threshold component and a video bitrate of the video stream at least meets a video bitrate threshold component.

4. The one or more non-transitory computer-readable media of claim 1, wherein the acts further comprise determining that the video quality of the video stream at least meets the quality threshold when a predetermined number of behavioral biometric characteristics of a person are detected in video content of the video stream by a behavioral biometric analysis algorithm.

5. The one or more non-transitory computer-readable media of claim 4, wherein the behavioral biometric analysis algorithm is executed by an artificial intelligence (AI) chipset of the user device.

6. The one or more non-transitory computer-readable media of claim 1, wherein the downgrading the video quality includes at least one of applying a scramble mask to the video stream to scramble video content of the video stream or re-encoding the video stream into a lower quality video stream that has at least one of a lower video resolution or a lower bitrate that prevents the behavioral biometric analysis.

7. The one or more non-transitory computer-readable media of claim 6, wherein the applying the scrambling mask or the re-encoding includes applying the scrambling mask to the video stream or re-encoding the video stream at an edge server associated with a base station of the wireless carrier network.

8. The one or more non-transitory computer-readable media of claim 1, wherein the downgrading the video quality includes directing the user device to encode the video stream as captured by a camera of the user device using at least one of a lower video resolution or a lower video bitrate setting.

9. The one or more non-transitory computer-readable media of claim 1, further comprising, in response to the video privacy policy not permitting the transmission of the video stream of the video quality, directing the user device to present a warning notification indicating that the video stream is usable for the behavioral biometric analysis, and requesting an input as whether to downgrade the video quality of the video stream.

10. The one or more non-transitory computer-readable media of claim 9, wherein the downgrading includes downgrading the video quality of the video stream in response to receiving a selection from the user device to downgrade the video quality.

11. A user device, comprising:
one or more processors; and memory including a plurality of computer-executable components that are executable by the one or more processors to perform a plurality of actions, the plurality of actions comprising:

receiving a video stream that includes image signals from a camera of the user device, the video stream having a video quality that at least meets a quality threshold for behavioral biometric analysis;

determining whether a video privacy policy for the user device permits capture and storage of the video stream of the video quality at the user device;

in response at least to the video privacy policy not permitting the capture and storage of the video stream of the video quality at the user device, downgrading the video quality of the video stream to generate a downgraded video stream that prevents behavioral biometric analysis and storing the downgraded video stream in a data store of the user device; and in response to the video privacy policy permitting the capture and storage of the video stream of the video quality, storing the video stream of the video quality in the data store of the user device.

12. The user device of claim 11, wherein the plurality of actions further comprise determining that the video quality of the video stream at least meets the quality threshold when a video resolution of the video stream at least meets a video resolution threshold.

13. The user device of claim 11, wherein the plurality of actions further comprise determining that the video quality of the video stream at least meets the quality threshold at least when a video resolution of the video stream at least meets a video resolution threshold component and a video bitrate of the video stream at least meets a video bitrate threshold component.

14. The user device of claim 11, wherein the plurality of actions further comprise determining that the video quality of the video stream at least meets the quality threshold when a predetermined number of behavioral biometric characteristics of a person are detected in video content of the video stream by a behavioral biometric analysis algorithm.

15. The user device of claim 14, wherein the behavioral biometric analysis algorithm is executed by an artificial intelligence (AI) chipset of the user device.

16. The user device of claim 11, wherein the video quality downgrading includes at least one of applying a scramble mask to the video stream to scramble video content of the video stream, re-encoding the video stream into a lower quality video stream that has at least one of a lower video resolution or a lower bitrate that prevents the behavioral biometric analysis, or encoding new image signals for the video stream into the lower quality video stream.

17. The user device of claim 11, further comprising, in response to the video privacy policy not permitting the capture and storage of the video stream of the video quality, directing the user device to present a warning notification indicating that the video stream is usable for the behavioral biometric analysis, and requesting an input as whether to downgrade the video quality of the video stream.

18. The user device of claim 17, wherein the downgrading includes downgrading the video quality of the video stream in response to receiving a selection from the user device to downgrade the video quality.

19. A computer-implemented method, comprising:

receiving, at one or more computing nodes, a video stream from a user device that is destined for a recipient device, the video stream having a video quality that at least meets a quality threshold for behavioral biometric analysis;

determining, at the one or more computing nodes, whether a video privacy policy for the user device permits a transmission of the video stream of the video quality to the recipient device;

in response at least to the video privacy policy not permitting the transmission of the video stream of the video quality, downgrading, via the one or more computing nodes, the video quality of the video stream to generate a downgraded video stream that prevents behavioral biometric analysis and transmitting the downgraded video stream to the recipient device; and in response to the video privacy policy permitting the transmission of the video stream of the video quality, transmitting, via the one or more computing nodes, the video stream of the video quality to the recipient device.

20. The computer-implemented method of claim 19, wherein the downgrading the video quality includes at least one of applying a scramble mask to the video stream to scramble video content of the video stream or re-encoding the video stream into a lower quality video stream that has at least one of a lower video resolution or a lower bitrate that prevents the behavioral biometric analysis.

* * * * *